UNITED STATES PATENT OFFICE.

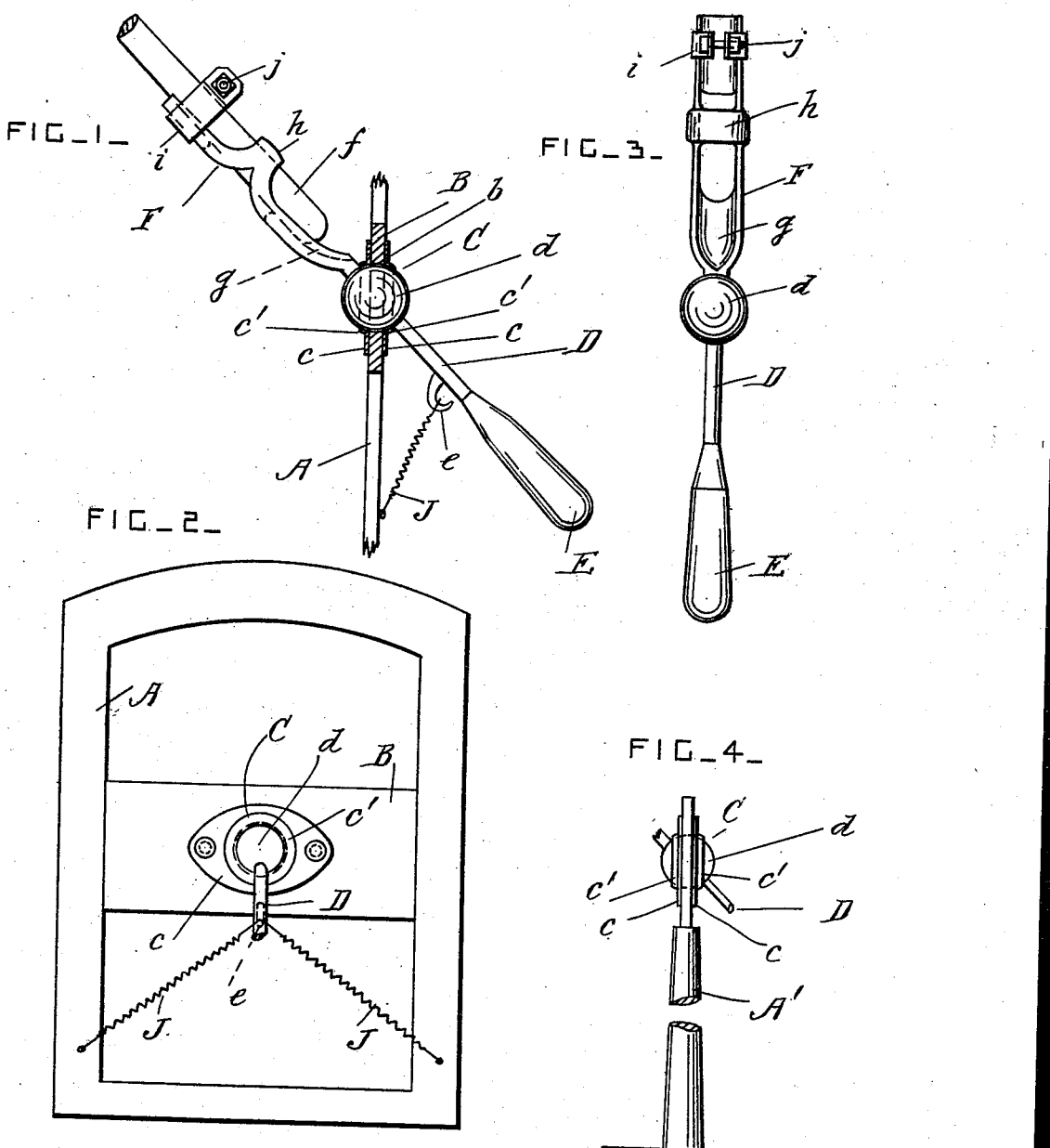

LEONARD HANCHER, OF LEESBURG, OHIO.

WHIP-MANIPULATOR.

999,989. Specification of Letters Patent. Patented Aug. 8, 1911.

Application filed April 15, 1911. Serial No. 621,367.

*To all whom it may concern:*

Be it known that I, LEONARD HANCHER, a citizen of the United States, residing at Leesburg, in the county of Highland and State of Ohio, have invented certain new and useful Improvements in Whip-Manipulators; and I do hereby declare the following to be a full, clear, and exact description of the invention, such as will enable others skilled in the art to which it appertains to make and use the same.

This invention relates to devices for manipulating whips in bad weather from the interior of closed vehicles; and it consists in the novel construction and combination of the parts hereinafter fully described and claimed.

In the drawings, Figure 1 is a side view of a whip manipulator constructed according to this invention and showing the bearing in section. Fig. 2 is a front view of the support and the bearing drawn to a smaller scale and showing the lever handle in section. Fig. 3 is a front view of the lever. Fig. 4 is a side view of a modification and is drawn to a smaller scale.

A is a front panel of a vehicle of any approved construction having a crossbar B at its middle part. The upper part of the panel is preferably provided with a glass window.

C is a spherical bearing at the middle part of the crossbar B. This bearing is preferably formed by cutting a circular hole *b* in the crossbar, and securing two plates *c* to the crossbar, one on each side thereof. These plates have curved flanges *c'* which project around the hole *b*.

D is a lever provided at its middle part with a ball *d* which is mounted in the spherical bearing so that it can be moved pivotally in all directions. One end of the lever is provided with a handle E and a hook *e*. The other end of the lever, which projects from the vehicle, is provided with a socket F for engaging with the handle *f* of a whip of any approved make. This socket has an inclined spoon-shaped end portion *g* on one side near the ball, and it has a bar *h* on the other side near its middle part. At its free end the socket has a spring clamp *i* provided with a bolt *j*. This spring clamp may be formed integral with the socket, or it may consist of a band formed separate from the socket and slipped over its free end portion. A socket constructed in this way will engage tightly with whip handles of various sizes. The whip handle is secured in the socket, and the whip is manipulated by means of the lever handle E from the interior of the vehicle.

J are spiral springs secured to the side portions of the panel A and to the hook *e* on the lever. These springs hold the whip lever in a conveniently inclined position as shown in Fig. 1 when not required in use, and they do not interfere with the ordinary action of the whip, but the springs can be disconnected from the hook whenever desired.

In Fig. 4 the bearing C is shown on a supporting post A' instead of a crossbar, so that the device can be applied to an open vehicle.

What I claim is:

1. In a whip manipulator, the combination, with a support provided with a spherical bearing, of a lever having a ball at its middle part which is mounted in the said bearing, said lever having a socket at one end for engaging with a whip handle.

2. In a whip manipulator, the combination, with a support provided with a spherical bearing, of a lever having a ball at its middle part which is mounted in the said bearing, said lever having a socket at one end for engaging with a whip handle and having a hook on its other end portion, and two spiral springs secured to the side portions of the said support and connected to the said hook.

3. In a whip manipulator, the combination, with a supporting bar having a circular hole, and two plates having circular curved flanges secured to the opposite sides of the bar around the hole and forming with it a spherical bearing, of a lever having a ball at its middle part which is mounted in the said bearing, said lever having a socket at one end for engaging with a whip handle.

4. In a whip manipulator, the combination, with a support provided with a spherical bearing, of a lever having a ball at its middle part which is mounted in the said bearing, said lever having a socket at one end for engaging with a whip handle, and said socket having an inclined spoon-shaped portion on one side near the said ball and having also a bar on its other side near its middle part and a spring fastening clip at its free end.

In testimony whereof I have affixed my signature in the presence of two witnesses.

LEONARD HANCHER.

Witnesses:
 H. C. KEEN,
 A. FLESHER.

Copies of this patent may be obtained for five cents each, by addressing the "Commissioner of Patents, Washington, D. C."